United States Patent
Satake et al.

(10) Patent No.: US 6,442,486 B1
(45) Date of Patent: Aug. 27, 2002

(54) METHOD FOR DETERMINING AMOUNT OF FERTILIZER APPLICATION FOR GRAIN CROPS, METHOD FOR ESTIMATING QUALITY AND YIELD OF GRAINS AND APPARATUS FOR PROVIDING GRAIN PRODUCTION INFORMATION

(75) Inventors: Satoru Satake, Tokyo; Yukio Hosaka, Hiroshima; Hideharu Maruyama, Hiroshima; Nobuhiko Nakamura, Hiroshima, all of (JP)

(73) Assignee: Satake Corporation, Tokyo (JP)

( * ) Notice: Subject to any disclaimer, the term of this patent is extended or adjusted under 35 U.S.C. 154(b) by 0 days.

(21) Appl. No.: 09/385,094

(22) Filed: Aug. 30, 1999

(30) Foreign Application Priority Data

| Sep. 9, 1998 | (JP) | 10-254717 |
| Feb. 18, 1999 | (JP) | 11-040280 |
| Jun. 2, 1999 | (JP) | 11-154866 |

(51) Int. Cl.$^7$ .............................................. G06F 17/60
(52) U.S. Cl. ......................................... 702/2; 250/226
(58) Field of Search .................... 702/2, 1, 3; 382/110; 250/341.7, 227.11, 222.1; 56/1

(56) References Cited

U.S. PATENT DOCUMENTS

| 4,371,081 A | 2/1983 | Satake ......................... 209/580 |
| 4,429,225 A | 1/1984 | Fumoto et al. .............. 250/353 |
| 4,630,736 A | 12/1986 | Maughan et al. ........... 209/587 |
| 4,699,274 A | 10/1987 | Saika .......................... 209/587 |
| 4,742,228 A | 5/1988 | Bischoff ...................... 250/341 |
| 4,801,804 A | 1/1989 | Rosenthal .................... 250/341 |

(List continued on next page.)

FOREIGN PATENT DOCUMENTS

| EP | 0443769 A2 | 8/1991 | ............. B07C/5/02 |
| EP | 0727260 | 8/1996 | ........... B07C/5/342 |
| EP | 0834731 A2 | 4/1998 | .......... G01N/21/33 |
| JP | 08015141 A | 1/1996 | .......... G01N/21/49 |
| | 5,135,114 A | 8/1992 | Satake et al. ................ 209/558 |

OTHER PUBLICATIONS

Nippon Shokuhin Kogyo Gakkaishi, "Applicability of Near Infrared Reflectance Method to Moisture, Protein and Ash Measurements of Buckwheat Flours", 1984, vol. 31, No. 3, pp. 200–202.

Nippon Shokuhin Kogyo Gakkaishi, "Near Infrared Reflectance Analysis for Determining Moisture, Protein and Ash Contents in Home-grown Wheat Flours", 1984, vol. 31, No. 1, pp. 50–53.

*Primary Examiner*—Edward Lefkowitz
*Assistant Examiner*—Victor J. Taylor
(74) *Attorney, Agent, or Firm*—Fish & Richardson P.C.

(57) ABSTRACT

A method and an apparatus for determining an amount of fertilizer to be applied to grain crops are disclosed. A fertilizer application related formula for obtaining the necessary amount of fertilizer to be applied is established by analyzing growth information including leaf blade information, fertilizer application information and quality information, all the above information being obtained in advance from a number of grains or grain crops. The formula thus established is stored in the memory. The necessary amount of fertilizer to be applied for each specific period for grain crops which are presently under growth is calculated by applying to the above formula, growth information of the grain crops presently under growth and target quality information. The growth information includes leaf blade information in relation to a specific period. The results of the calculation are displayed or printed out. A method and an apparatus for estimating a quality or yield of grains prior to the harvesting is also disclosed. In this case, a quality or yield related formula is established in advance and stored in the memory.

6 Claims, 7 Drawing Sheets

U.S. PATENT DOCUMENTS

| | | | |
|---|---|---|---|
| 5,220,400 A | 6/1993 | Anderson et al. | 356/241 |
| 5,254,858 A | 10/1993 | Wolfman et al. | 250/339 |
| 5,258,825 A | 11/1993 | Reed et al. | 356/402 |
| 5,443,164 A | 8/1995 | Walsh et al. | 209/580 |
| 5,638,961 A | 6/1997 | Satake et al. | 209/580 |
| 5,668,719 A * | 9/1997 | Bobrov et al. | 364/420 |
| 5,735,402 A | 4/1998 | Pezzoli et al. | 209/129 |
| 5,793,035 A * | 8/1998 | Beck et al. | 250/222.1 |
| 5,837,997 A * | 11/1998 | Becket et al. | 250/227.11 |
| 5,859,435 A * | 1/1999 | Satake et al. | 250/341.7 |
| 6,160,902 A * | 12/2000 | Dickson et al. | 382/110 |

* cited by examiner

METHOD FOR DETERMINING AMOUNT OF FERTILIZER APPLICATION FOR GRAIN CROPS, METHOD FOR ESTIMATING QUALITY AND YIELD OF GRAINS AND APPARATUS FOR PROVIDING GRAIN PRODUCTION INFORMATION

BACKGROUND OF THE INVENTION (1) Field of the Invention

The present invention relates to a method for determining the amount of fertilizer which, in producing grains such as rice grains or wheat grains, is applied at appropriate times, a method for estimating the quality and the yield of the rice and wheat as results of the fertilizer applied, and an apparatus for providing such production information.

(2) Description of the Related Art

Conventionally, the production control of grain crops such as rice grains and wheat grains has been so conducted that, the producers independently have collected information such as the leaf colors and heights of plants and the number of stems which serve as information for the control, have effected a nutritional diagnosis, and have effected the producers' own fertilizer application by relying on their intuition and experience.

However, the producers have effected the fertilizer application, not necessarily with the full understanding of the principle and methods which are used for producing targeted grains (for example, good taste in the case of rice and high protein in the case of wheat), but by following the conventional fertilizer application of the fields used in the production for many years, so that the chances when they could appreciate, by comparing with others, as to whether the method used is appropriate for the production of the grains are when they receive relevant information from agricultural advisors of Japanese Agricultural Association or consulting organizations.

On the other hand, although many quality and grade measuring apparatuses have been developed for the measurement of elements such as rice taste and protein of the grains after they are harvested, such information has never been systematically put together and effectively reflected to the cultivating control by the producers. Even if such information is made available, it has been difficult for individual producers to have such information reflected to the cultivating control with the understanding of and based on the relation between the information of the amounts and times of fertilizer application and the information on qualities and grades, so that the producers had no alternative but to rely on their intuition and experience. That is, there has been no means to interrelate the controlling technique which the individual producers possessed with respect to the cultivation of grains with the resulting information with respect to the qualities in a systematic way, and it has been difficult for the individual producers to control the cultivation based on any useful information and to obtain any positive information as to what cultivation control may be made for the targeted qualities and grades of grains.

Generally, the cultivation control is carried out based on the quality and grade as the ultimate goal, but sometimes the cultivation control is made for the ultimate goal of yields for grains such as long grain types and wheat grains. It is true that, also in this cultivation control ultimately aiming at a large yield, the producers rely on their intuition and experience.

In the cultivation control carried out based on the producers' intuition and experience, the aims are for the ideal qualities and grades, and a larger yield, but in this case the final assessment can be made only after the harvesting. That is, the qualities, grades and yields become definite only after the harvesting so that, in the case of buying and selling of, for example, the rice based on the rice taste, the assessment in the case of buying before the harvesting is indiscriminately based on the kinds, producers and localities, so that the assessment is not directly based on the actual rice taste and relies on the experience and intuition of buyers. Also, the producers had no means to show to the buyers any definite support with respect to the expected rice taste after the harvesting.

Also, in the aspect of yields, since the final yield does not become available until after the harvesting, and the buying before the harvesting and any plans for expenditure based thereon often use very rough figures, it is often necessitated to change such plans according to the amount of the actual yields after the harvesting. The producers had no means by which the reliable yield can be ensured.

As explained above, since no method and apparatus were available for providing information which interrelates and systematizes the cultivation control which has been relied on the producers' experience and the intuition based thereon and the qualities and grades of grains resulted therefrom, there was no means available for reliably ensuring the targeted qualities and grades or yields. Therefore, it has been desired to provide a method with which, in order to obtain the targeted qualities and grades or the targeted yields from the grain crops actually growing, it becomes known specifically what amount of fertilizer is to be applied next, or to develop an apparatus which can indicate such information with the apparatus being adapted to be used by anybody.

Also, about one month before the harvesting when the cultivation control has generally been completed, if information becomes available as to whether the qualities and grades are in accord with those targeted, or whether the yields can be obtained as targeted, the producers have means to guarantee the qualities and grades or to ensure the yields, and to ensure the earnings resulting therefrom. However, if the cultivation control solely relies as heretofore on the producers' experience and intuition, the estimation of the after-harvesting information is difficult, so that it is desired to develop a method which provides the reliable information to be indicated to those on the buying side or an apparatus which provides such information.

SUMMARY OF THE INVENTION

An object of the present invention, therefore, is to overcome the problems existing in the prior art, and to provide a method for determining the amount of fertilizer to be applied and an apparatus for providing production information with which the calculated results are displayed at its display section. According to one aspect, the invention enables the determination of the amount of fertilizer to be applied in growth stages of the grain crops. For this purpose, on one hand, a fertilizer application related formula for obtaining the amount of fertilizer to be applied at a specific stage is established by analyzing the relationship among growth information including leaf blade information related to the specific stage, quality information of produced grains, and fertilizer application information related to the specific stage, the formula being stored in a memory section. On the other hand, the amount of fertilizer to be applied at the specific stage to grain crops presently under growth is calculated from growth information including leaf blade information related to the specific stage, and targeted quality information obtained and input in an input section, and the amount of fertilizer to be applied is calculated at an arithmetic section by applying the above pieces of information to the fertilizer application related formula established in advance and by the analysis.

For producing grains of targeted quality, in order to make judgement as to what amounts of fertilizer are to be applied at specific stages such as a basal dressing stage, an additional manuring stage, an ear manuring stage, and a top dressing at ripening stage, a formula is established in advance in the following way. From the growth information including the leaf blade information (nitrogen content, color, chlorophyll content, etc. of a leaf) which is related to specific stages in the past growth records and which has brought growth results at specific stages, the fertilizer application information (amounts, times, etc. of the fertilizer applied), and the quality information (rice taste and grade in rice and protein content in wheat, etc.) of the grains produced under these conditions, the amounts of fertilizer to be applied are made target variables at specific stages and, by subjecting these relations to a linear analysis or a non-linear analysis, the fertilizer application related formula for obtaining the amounts of fertilizer to be applied at specific stages is established.

In the formula established as above, by inputting the growth information including leaf blade information related to specific stages, and the quality information such as the taste value of rice which is targeted by the producers, it is possible to obtain the amounts of the fertilizer to be applied at the specific stages. If the producers follow the results and apply the amounts of fertilizer to be applied at the specific stages, the production of the grains can follow the track of target quality production. That is, conventionally, the determination of the amounts of fertilizer to be applied based on the information relating to colors of leaves, number of stems and heights of plants or any information from various sources was made based on the intuition and experience of the producers, and the aim was to produce the grain of at least the same quality or the grain whose quality is not lowered. However, ever, according to the invention, in the quality related formula analyzed from the growth information including the actually measured leaf blade information, the fertilizer application information and the quality information, it is possible to input the targeted quality information thereby enabling the production of grains in a positive manner. The specific stages herein mentioned include, for rice, the fertilizer application stage in the period intervening between a panicle initiation stage and a reduction division stage, and the fertilizer application stage in the period subsequent to the reduction division, which stages are said to be important fertilizer application stages and, for wheat, a stage just before and after the panicle initiation stage and a stage just before and after a maximum tiller number stage, which stages are said to be important fertilizer application stages. Further, by adding basal dressing information to the fertilizer application information in establishing the fertilizer application related formula, it is possible to make the formula more precise because the fertilizer application information can include the first information in the entire growth period. Also, by renewing the formula every year by adding relevant information, it is possible to make the formula more accurate in relation to localities and brands of grains.

Further, according to another aspect, the invention enables the determination of the amount of fertilizer to be applied in growth stages of the grain crops. For this purpose, on one hand, a fertilizer application related formula for obtaining the amount of fertilizer to be applied at a specific stage is obtained in advance by analyzing the relationship among growth information including leaf blade information related to the specific time, yield information of produced grains, and fertilizer application information related to the specific stage, and this formula is stored in a memory section. On the other hand, the amount of fertilizer to be applied at the specific stage to presently growing grain crops is calculated from growth information of the grain crops presently under growth including leaf blade information related to the specific stage, and the targeted yield information obtained and input in the input section, and the amount of fertilizer to be applied is obtained at an arithmetic section by applying these pieces of information to the fertilizer application related formula established in advance and by the analysis. The invention also provides an apparatus for providing production information with which the calculated results are displayed at its display section.

For producing grains of targeted yield, in order to make judgement as to what amounts of fertilizer are to be applied at specific stages such as an additional manuring stage, an ear manuring stage, and a top dressing at ripening stage, a formula is established in advance in the following way. From the growth information including the leaf blade information (nitrogen content, color, chlorophyll content, etc. of a leaf) which is related to specific stages in the past growth records and which has brought about growth results at specific stages, the fertilizer application information, and the yield information (yields and harvesting times of rice and wheat) of the grains produced under these conditions, the amounts of fertilizer to be applied are made target variables at specific stages and, by subjecting these relations to a linear analysis or a non-linear analysis, the fertilizer application related formula for obtaining the amounts of fertilizer to be applied at specific stages is established.

In the formula established as above, by inputting the growth information including the leaf blade information related to specific stages, and the yield information such as the yield quantity which is targeted by the producers, it is possible to calculate the amounts of fertilizer to be applied at the specific stages. If the producers follow the results and apply the calculated amounts of fertilizer at the specific stages, the production of the grains can follow the track of target yield. Conventionally, the determination of the amounts of fertilizer application based on the information relating to colors of eaves, number of stems and heights of plants or any information from various sources was made based on the intuition and experience of the producers, and the aim was to produce the grain of at least the same yield or the grain whose yield is not lowered. However, according to the invention, in the yield related formula analyzed from the growth information including the actually measured leaf blade information, the fertilizer application information and the quality information, it is possible to input the targeted yield information thereby enabling the determination of the amounts of fertilizer application appropriate to the targeted yields.

Also, the invention enables the estimation of the quality of grains to be harvested after the grain crops have grown. For this purpose, on one hand, a quality related formula is established by analyzing the relationship between growth information during the growth of rice crops including leaf blade information and fertilizer application information, and the quality of the grown grains, and this formula is stored in the memory section. On the other hand, growth information including the leaf blade information and fertilizer application information is obtained from the grain crops presently under growth and is input to the input section, and the quality of grains after the growth is calculated at an arithmetic section by applying these pieces of information to the quality related formula established in advance by the analysis. The calculated results are displayed at the display section as an apparatus for providing production information.

According to the above, the quality related formula with which the quality of the grain to be harvested can be estimated before the harvesting is established by linear analysis or non-linear analysis of the quality of the harvested grains and the growth information including leaf blade information and the fertilizer application information in an overall growth stage or a characteristic stage such as a panicle initiation stage, a reduction division stage, or a maximum tiller number stage, with the quality of the grains after the harvesting being made the targeted variables. In this way, by inputting in the quality related formula the necessary information in the growth period, the producers can estimate the quality of the grains in the case where the grains are to be timely harvested. Thus, since the estimation of the quality of the grains can be made in advance of the harvesting, which was not possible before, the producers can use the estimation as a support to the quality.

Also, as a further aspect, the invention provides a method for estimating the yield of grains to be harvested after the growth of crops. For this purpose, on one hand, a yield related formula is established by analyzing the relationship between growth information including leaf blade information and fertilizer application information related to the growth periods, and yield information of grown grains, and this formula is stored in the memory section. On the other hand, the growth information including the leaf blade information and the fertilizer application information is obtained from the grain crops presently under growth and is input to the input section, and the yield of grains after the growth is calculated at an arithmetic section by applying these pieces of information to the yield related formula established in advance by the analysis. The calculated results are displayed at the display section as an apparatus for providing production information.

According to the above, the yield related formula with which the yield of the grains to be harvested can be estimated before the harvesting is established by linear analysis or non-linear analysis of the yield of the harvested grains and the growth information including leaf blade information and the fertilizer application information in an overall growth stage or a characteristic stage such as a panicle initiation stage, a reduction division stage, or a maximum tiller number stage, with the yield of the grains after the harvesting being made the targeted variables. In this way, by inputting in the quality related formula the necessary information in the growth periods, the producers can estimate the yield of the grains in the case where the grains are to be harvested timely. Thus, since the estimation of the yield of the grains can now be made in advance of the harvesting, which was not possible before, the producers can use the estimation as a support to the yield.

In the above growth information, there are cases wherein soil information relating to brands or production localities is included. The amount and time of fertilizer application may sometimes be different depending on brands of grains. If the formula is established individually for application to an individual brand, it is possible to determine the accurate amount of fertilizer to be applied and to estimate the exact yield of the grains when timely harvested. Also, since the growth of the crops is influenced by the expressiveness of the nitrogen-supplying potential of soil and the amount of fertilizer applied, the formula specific to kinds of soil, such as gray lowland soil, gley soil, or gray volcanic ash soil (kuroboku soil), it is possible to determine the amount of fertilizer to be applied most suited to the soil and the growth.

Also, in the growth information, if the accumulated temperature and the growth days are added, it is possible to determine a further appropriate amount of fertilizer to be applied in order to obtain grains of good quality or high yield, or to make accurate estimation of the quality or the yield. As explained earlier, the leaf blade information includes the nitrogen contents, colors, and chlorophyll contents of leaf blades. The leaf blade values can be measured and calculated by establishing in advance the formula for obtaining the leaf blade values based on the absorbance value obtained by irradiating the light on a leaf blade whose leaf blade values are known and the known leaf blade values, and the absorbance value obtained by irradiating the light on a leaf blade whose leaf blade values are unknown. Therefore, from the growth information including leaf blade value measured and calculated, the fertilizer application related formula, the quality related formula or the yield related formula may be established; from the growth information including the leaf blade values of the grain crops presently under growth and the fertilizer application related formula, the amount of the fertilizer to be applied may be established; from the quality related formula, the quality may be estimated; or from the yield related formula, the yield may be estimated. Further, by making the absorbance directly as the leaf blade information without passing through the leaf blade related formula, the growth information including leaf blade information constituted by the absorbance may be used for establishing the fertilizer application related formula, the quality related formula or the yield related formula.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
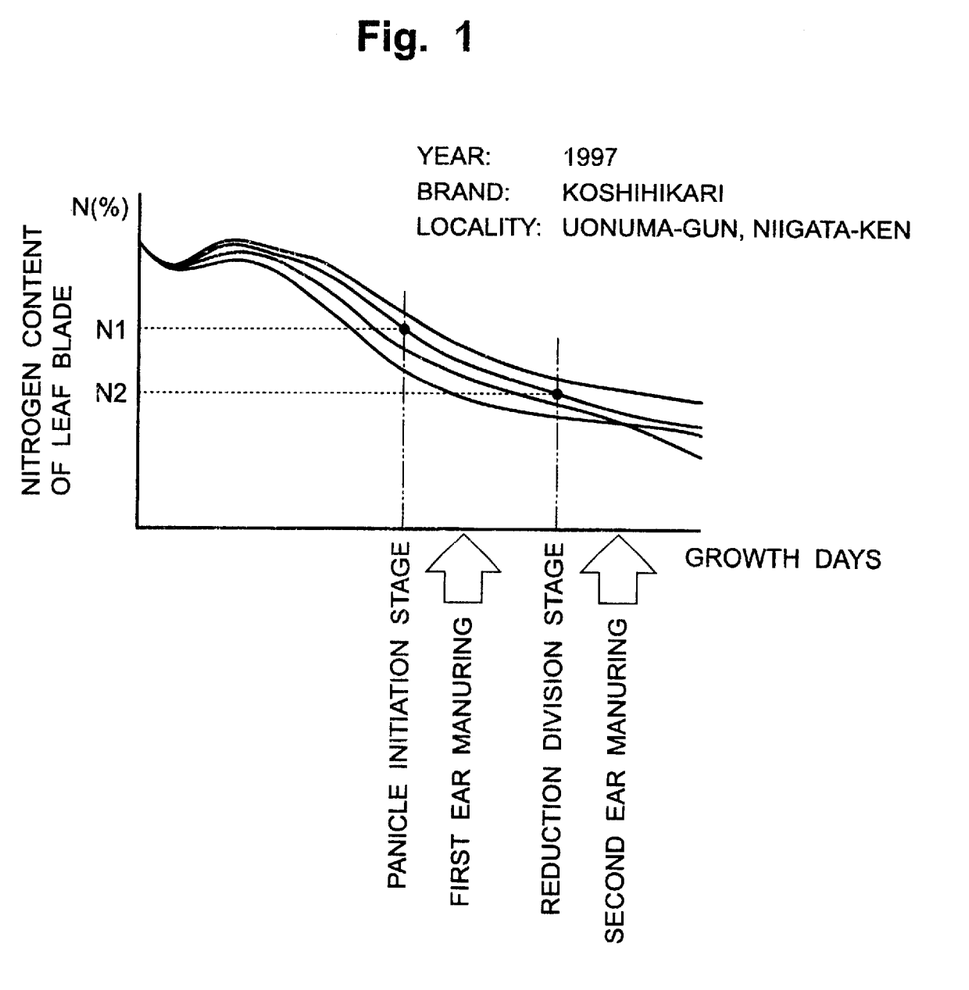
FIG. 1 is a graph showing variations in nitrogen contents in a leaf blade obtained from a plurality of growing rice crops.
Figure 2:
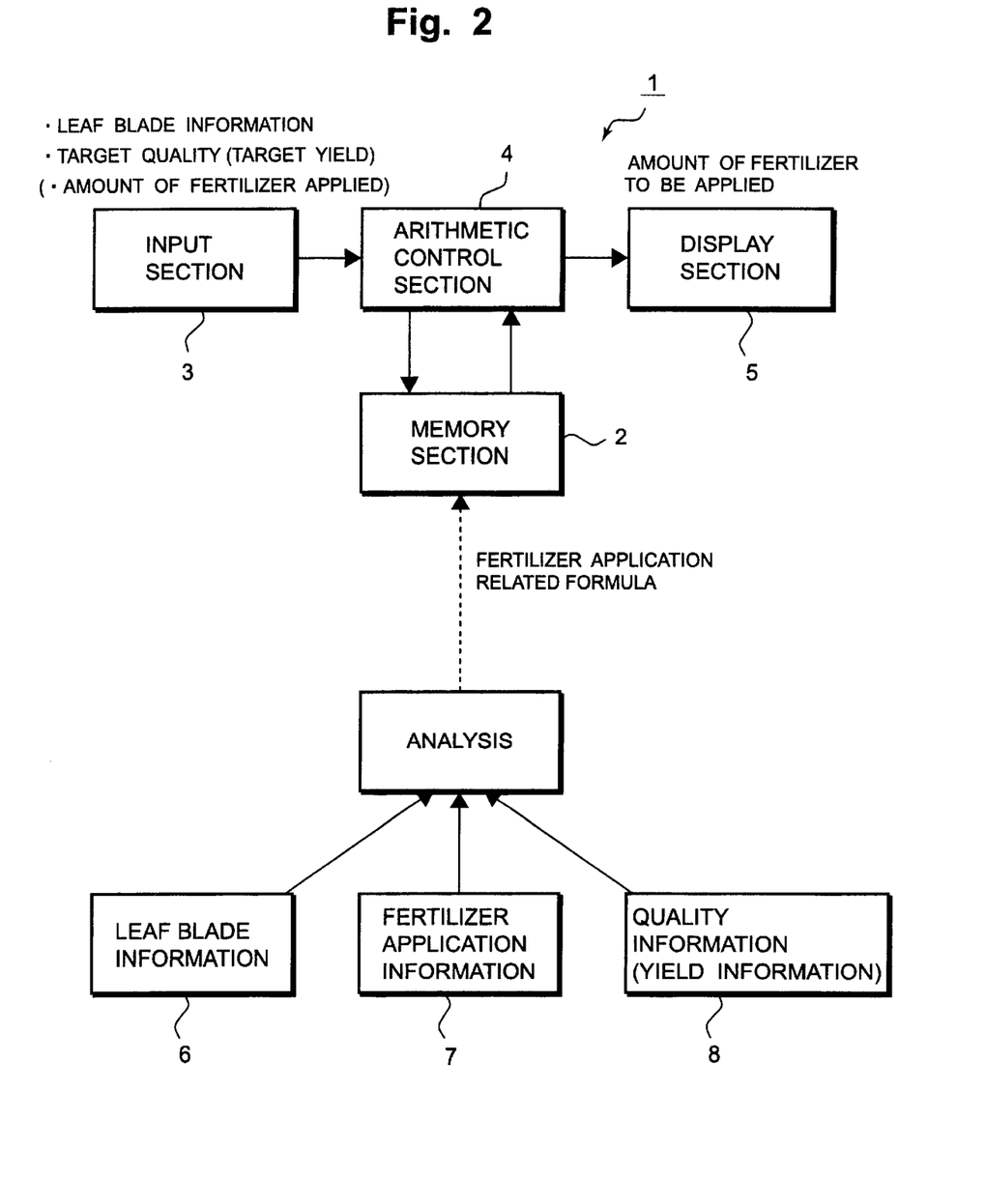
FIG. 2 is a block diagram showing an apparatus for providing information on rice production.

Now, preferred embodiments according to the invention are explained with reference to FIGS. 1 and 2. The explanation is made herein with respect to the rice crops in various grain crops. FIG. 1 shows variations in nitrogen contents of a leaf blade obtained from a plurality of growing rice crops. FIG. 2 is a block diagram showing an apparatus 1 for providing production information for rice. The apparatus 1 for providing information on rice production includes a memory section 2 for storing the fertilizer application related formula, an input section 3 for inputting targeted quality information and growth information including the necessary leaf blade information, an arithmetic and control section 4 to which the memory section 2 and the input section 3 are connected and at which the amount of fertilizer to be applied at a specific stage is calculated using the formula in the memory section 2 and the input value at the input section 3, and a display section 5 for visually displaying the amount of fertilizer to be applied at the specific stage, which is a result calculated at the arithmetic and control section 4. The formula stored in the memory section 2 of FIG. 2 is the fertilizer application related formula for deriving the amount of fertilizer to be applied at a specific stage, which formula is established in advance by analyzing the relations among the leaf blade information (growth information) 6, fertilizer application information 7 and quality information (yield information) 8.

First, a method for determining the amounts of fertilizer to be applied during the growth of rice crops is explained with reference to FIGS. 1 and 2. Hereunder, the growth information is explained as corresponding to the nitrogen content N1 in the leaf blade. Among a plurality of data shown in FIG. 1, the fertilizer application related formula for obtaining the amount of fertilizer to be applied at a specific stage is established by analyzing the relations among the leaf blade information (growth information) 6 related to a specific stage for applying first ear manuring, for example, leaf blade nitrogen content N1 at the panicle initiation stage which is immediately before the time when the first ear manuring is applied, fertilizer application information 7 at a specific stage for applying the first ear manuring, for example, the application amount of the first ear manuring, and quality information 8 of the rice harvested after the growth, for example, taste values of the rice, with the amount of the application of the first ear manuring being used as targeted variables and other information as explanatory variables. In this case, when the formula is established based on a large amount of information on the same brand at a fixed locality, the degree of the completeness of the fertilizer application related formula is elevated. By the linear analysis and by using, for example, the first ear manuring as the targeted variable, the following formula becomes available:

First ear manuring=$F0$+Quality information (rice taste)·$F1$+Leaf blade nitrogen content ($N1$)·$F2$ wherein F0~F2 are constants
When a plurality of pieces of information of the first ear manuring, the quality information and the nitrogen content of the leaf blade are input to the above formula, the following formula becomes available:

First ear manuring 1=$F0$+Quality information 1·$F1$+Leaf blade nitrogen content 1·$F2$ First ear manuring 2=$F0$+Quality information 2·$F1$+Leaf blade nitrogen content 2·$F2$

. . .

First ear manuring $n$=$F0$+Quality information $n$·$F1$+Leaf blade nitrogen content $n$·$F2$ When the above formula is analyzed by multiple regression analysis, the following formula becomes available:

First ear manuring=$F0$+Quality information·$F1$+Leaf blade nitrogen content·$F2$+$C$ (1)

wherein C is a compensating value
By inserting, in the above formula, the quality information and the leaf blade nitrogen content of rice crops presently under growth, the first ear manuring can be obtained. Here the explanation is made using the linear analysis as an example, but the analysis may be a non-linear analysis. When, in the fertilizer application related formula established as above, nitrogen content of the leaf blade, which is the leaf blade information at the panicle initiation stage of the rice crops presently under growth, and the taste of the rice, which is targeted by the producers from the growing rice crops are inserted, the amount of fertilizer application of the first ear manuring can be obtained from the fertilizer application related formula. That is, the producers may apply the fertilizer based on the amount of fertilizer application of the first ear manuring obtained as above.

The fertilizer application related formula established as above is stored in the memory section 2 in the block diagram of the apparatus 1 for providing the production information of rice shown in FIG. 2. When the growth information of the rice crops presently under growth and the targeted rice taste are entered from the input section 3 by the producers, the amount of fertilizer to be applied is calculated at the arithmetic and control section 4 by applying to the fertilizer application related formula stored in advance at the memory section 2, the growth information and the rice taste entered from the input section 3. The amount of fertilizer application obtained by calculation is displayed at a display section 5. This display may be in the form of printing or display on a screen of a personal computer. Conventionally, the fertilizer application for the maintenance and control of the quality was in a passive way based on the producers' intuition and experience, but the invention makes it possible to effect the fertilizer to be applied in a positive way for producing the rice of better quality. The leaf blade nitrogen content in the above formulas is one that may be calculated based on the absorbance obtained by spectral analysis of the light irradiated on a leaf and the leaf blade related formula established in advance for obtaining the leaf blade nitrogen content based on the absorbance. Further, the absorbance related to the leaf blade nitrogen content may be used as it is as the leaf blade nitrogen content.

It is mentioned in the forgoing that the non-linear analysis may be used for obtaining the ear manuring related formula. The non-linear analysis is now explained similarly as for the above formula (1). Here, as the basic data necessary for the non-linear analysis, the amount of the first ear manuring, the rice taste as the quality information, and the leaf blade nitrogen content as the growth information are given, and also the time of the first ear manuring based on days elapsed from the seeding and similarly the measuring time of the leaf blade nitrogen content are simultaneously given and, by architecting a neural network for calculating the amount and the time of the first ear manuring respectively, not only the amount of the first ear manuring but also the appropriate time of the first ear manuring can be calculated.

Figure 3:
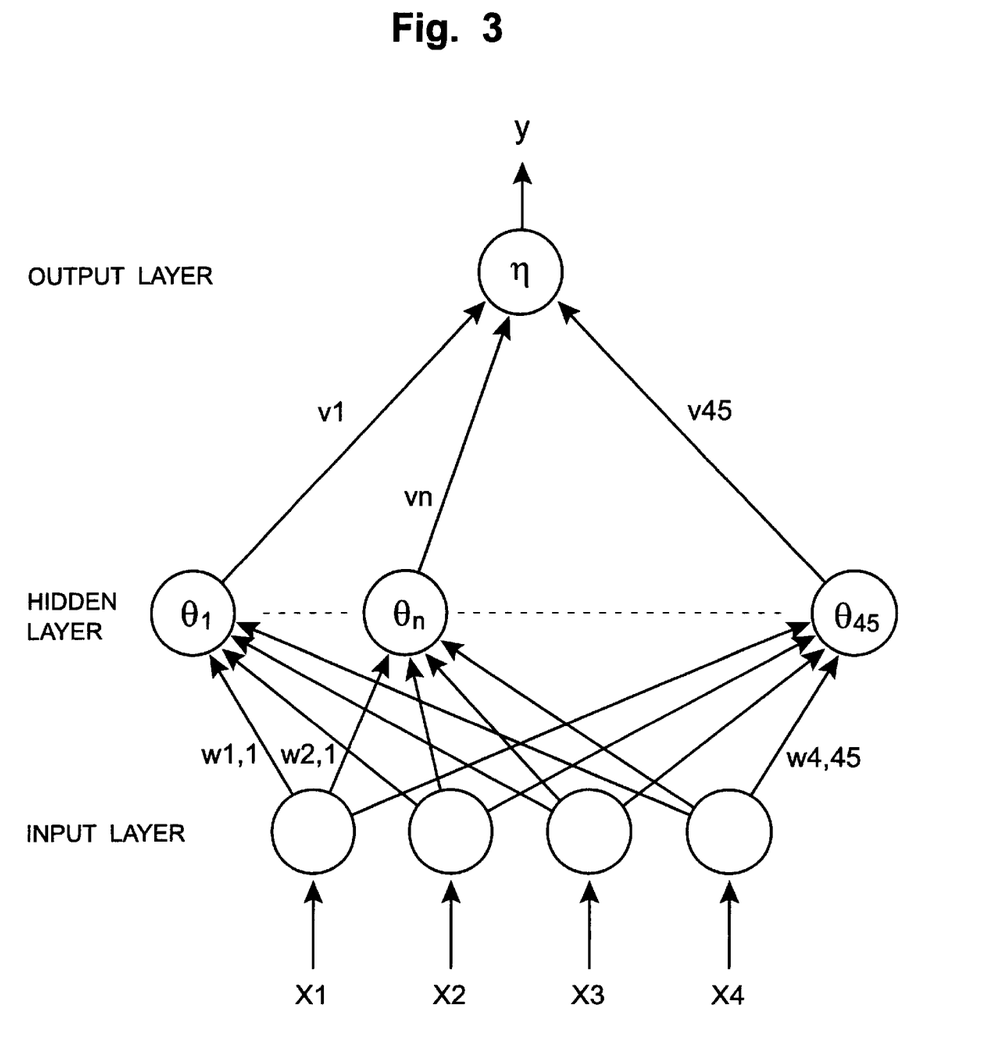
FIG. 3 is a diagram showing a neural network illustrating a non-linear analysis.

FIG. 3 diagrammatically shows the completed net work. As shown there, in an input layer of the network made up of the input layer, hidden layer and output layer, the rice taste X1, the leaf blade nitrogen content X2, the time X3 of the first ear manuring and the measuring time X4 of the leaf blade nitrogen content are respectively entered and the data are processed in the hidden layer including, for example, 45 hidden layer units. The data that have been processed at the hidden layer units are input to one output layer unit and eventually the amount "y" of the first ear manuring is output. In between the input layer unit and the hidden layer units, there is provided a weight "w" which is obtained by teeting, and the value entered in the input layer unit is output to the hidden layer units as the value multiplied with this weight "w". In the hidden layer units, the total sum of the values input from each input layer unit is calculated. The total sum is subjected to the sigmoid conversion and is output to the output layer unit. The symbol θ represents a bias in the hidden layer units and is the value obtained in advance by teeting. In between the hidden layer units and the output layer unit, there is provided a weight "v" obtained by teeting, and the value at the hidden layer units is entered to the output layer unit as the value multiplied with the weight "v". At the output layer unit, the total sum of the values input from the hidden layer units is calculated and, after this total sum is subjected to the sigmoid conversion, the amount of the first ear manuring is output. The symbol η represents the bias of the output layer unit and is the value obtained in advance by the teeting.

In the architecture of the above network, a large number of data which combine the amount of the first ear manuring, the rice taste value X1 corresponding thereto, the leaf blade nitrogen content X2, the time X3 of the first ear manuring, and the measuring time X4 of the leaf blade nitrogen content are used, and by providing the network with a plurality of patterns such as "where the X1–X4 are certain values, the amount of the first ear manuring will be "y"", the teeting is given to the network. The formula worked out by the neural network as above is incorporated into the memory section 2. If the fertilizer application stage of the first ear manuring is to be seen as the period elapsing from the seeding, this is not necessarily the same time in each year and changes in a subtle way so that the information as to whether the first ear manuring applied at the previous first ear manuring stage was appropriate should be added and it is necessary to determine the amount of the first ear manuring which suits the growth stages. As explained, by adding the previous application time of the first ear manuring, the amount of the first ear manuring can be calculated for the appropriate time of the first ear manuring. Also, by adding the measuring time of the leaf blade nitrogen content, since it covers the measuring time of the amount of the leaf blade nitrogen content which serves as a reference for determining the amount of the first ear manuring, the amount of the first ear manuring is controlled according to the measuring times of the leaf blade nitrogen content serving as the reference. As to the network for obtaining the time of the first ear manuring, by teeting the neural network with the time of the first ear manuring instead of the amount of the first ear manuring, the time of the first ear manuring can be calculated. In this case, too, by the previous time of the ear manuring and the measuring time of the leaf blade nitrogen content, the time of the first ear manuring obtained by the network is controlled.

Next, the fertilizer application related formula for deriving the amount of second ear manuring, in which the taste of rice is made a targeted value, is explained with reference to FIGS. 1 and 2. The fertilizer application related formula for obtaining the amount of fertilizer to be applied at a specific stage is established by analyzing the relations among the leaf blade information 6 related to the time at which the second ear manuring among a plurality of data shown in FIG. 1, for example, the leaf blade nitrogen content N2 at the reduction division stage immediately before the application of the second ear manuring, the fertilizer application information 7 at a specific stage for applying the second ear manuring, for example, the application amount of the second ear manuring, and the quality information 8 of the rice harvested resulting from the growth thereof, for example, the rice taste value, with the amount of the application of the second ear manuring being used as targeted variables and other information as explanatory variables. In this case, when the formula is established based on a large amount of information on the same brand at a fixed locality, the degree of the completeness of the fertilizer application related formula is elevated. That is, similarly as the above formula (1), the following may be given:

$$\text{Second ear manuring} = G0 + \text{Quality information} \cdot G1 + \text{Leaf blade nitrogen content} \cdot G2 + C \quad (2)$$

wherein G0~G2 are constants, and C is a compensating value

In the fertilizer application related formula established as above, when the leaf blade nitrogen content which is the leaf blade information at the reduction division stage of the rice crops presently under growth and the rice taste thereof which is targeted by the producers are entered from the input section 3, the arithmetic and control section 4 calculates from the fertilizer application related formula at the memory section 2 and the value at the input section, and outputs the amount of the second ear manuring, which is displayed at the display section 5. Based on the amount of fertilizer application of the second ear manuring calculated, the producers may carry out the application of fertilizer. Here, in establishing the fertilizer application related formula for the second ear manuring, it may be added thereto the leaf blade nitrogen content N1 as the leaf blade information at the panicle initiation stage and the amounts of the basal dressing and the first ear manuring already applied as the fertilizer application information. That is, the second ear manuring can be expressed as follows:

$$\text{Second ear manuring} = G0 + \text{Quality information} \cdot G1 + \text{Leaf blade nitrogen content} \cdot G2 + \text{Basal dressing} \cdot G3 + \text{First ear manuring} \cdot G4 + C$$

wherein G0~G4 are constants, and C is a compensating value

As above, by taking-in the information relating to the second ear manuring before the application of the second ear manuring as much as possible, the accuracy of the amount of the ear manuring is enhanced.

As the leaf blade information of the growth information, the nitrogen content, color and chlorophyll content of a leaf blade may be used individually or multiply. The growth information may additionally include the growth days, accumulated temperature, heights of plants or the number of stems, and especially the brands of the rice or the soil information including production localities. The amounts and times of fertilizer application may sometimes vary depending on brands of rice but, by establishing formulas individually for application on brand-to-brand basis, the accuracy in the determination of the amount of fertilizer application and in the estimation of the quality or yield can be enhanced. Also, since the growth of the crops is influenced by the expressiveness of the nitrogen-supplying potential of soil and the amount of fertilizer application, the establishing of formulas on soil-to-soil basis, such as gray lowland soil, gley soil or gray volcanic ash soil (kuroboku soil) will result in determining the amount of fertilizer application best suited to the soil and the growth. On the other hand, the fertilizer application information means specifically the amount of fertilizer application, but it is possible to add thereto the times of the fertilizer application which relate to the number of growth days and, by making such addition, it is enabled to specify the fertilizer application time based on the growth days. Further, the quality information means the taste of rice, and the rice taste is sometimes replaced by the amount of, for example, protein, which is an important element value in relation to the growth of rice, and the percentages of regular grains and ripened grains, etc. As explained before, as the leaf blade nitrogen content herein, the leaf blade nitrogen content obtained by the spectral analysis of the light irradiated on the leaf or the absorbance may be utilized.

Figure 4:
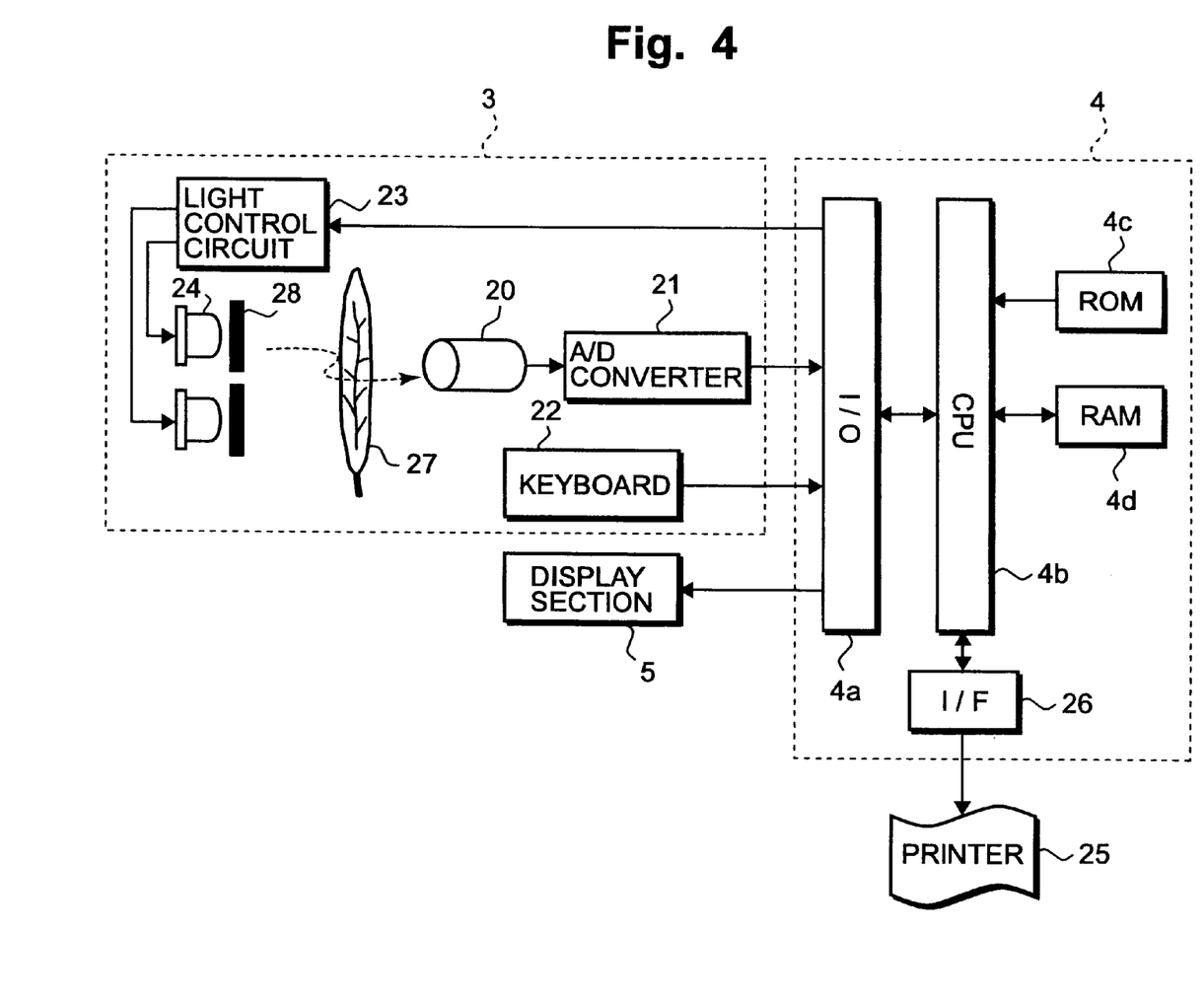
FIG. 4 is a block diagram showing further details of the apparatus shown in FIG. 2.

With reference to FIG. 4, a further explanation is made on the basis that the leaf blade nitrogen content is measured using near infrared spectral analysis. The input section 3 includes a light receiving section 20 for receiving transmitted light from a leaf 27 for measuring the nitrogen content of the leaf blade of the leaf of the rice crop, an A/D converter 21 for making A/D conversion of the signal from the receiving section 20, a light source (for example, light emitting diodes (LEDs)) 24 for irradiating the light on a leaf of the rice crop, a light control circuit 23 for causing the light source to emit the light and an input means (hereinafter referred to as "keyboard") 22 for inputting letters and numerical values. The arithmetic and control section 4 includes, around a CPU 4b which is an arithmetic and control element, an I/O port 4a which is a signal output element outputting the signal to the outside, a memory element (hereinafter referred to as "ROM") 4c in which the fertilizer application related formula and the processing program are stored, and a memory element (hereinafter referred to as "RAM") 4d for reading and writing, which are respectively connected to the CPU 4b. In this arrangement, the memory section 2 of FIG. 2 is incorporated in the arithmetic and control section 4. Also, the input section 3 and a display section 5 which displays, for example, the results from the arithmetic and control section 4 are connected to the CPU 4b through the I/O port 4a of the arithmetic and control section 4. Also, the printing means 25 for printing, for example, the results from the arithmetic and control section is connected to the CPU 4b through an I/F board 26. In between the light receiving section 20 and the light source 24, the leaf of the rice crop which grows in the field and for which the fertilizer application amount is to be determined is inserted and measured. The fertilizer application related formulas (1) and (2) for the first ear manuring and the second ear manuring established as above are stored in the ROM 4c. If the light receiving section 20, the A/D converter 21, the light control circuit 23 and the light source 24 are together formed as a separate unit with memory circuits, etc. being provided, the unit can be a portable measuring apparatus and the degree of convenience is enhanced. Also, the input section 3, the arithmetic and control section 4, and the display section 5 together may be arranged as an integral unit, in which case the keyboard 22 may be one which allows simpler operation by use of a plurality of selectable keys. Further, the means shown in FIG. 2 may be arranged as an integral unit thus forming a portable type apparatus.

Figure 5:
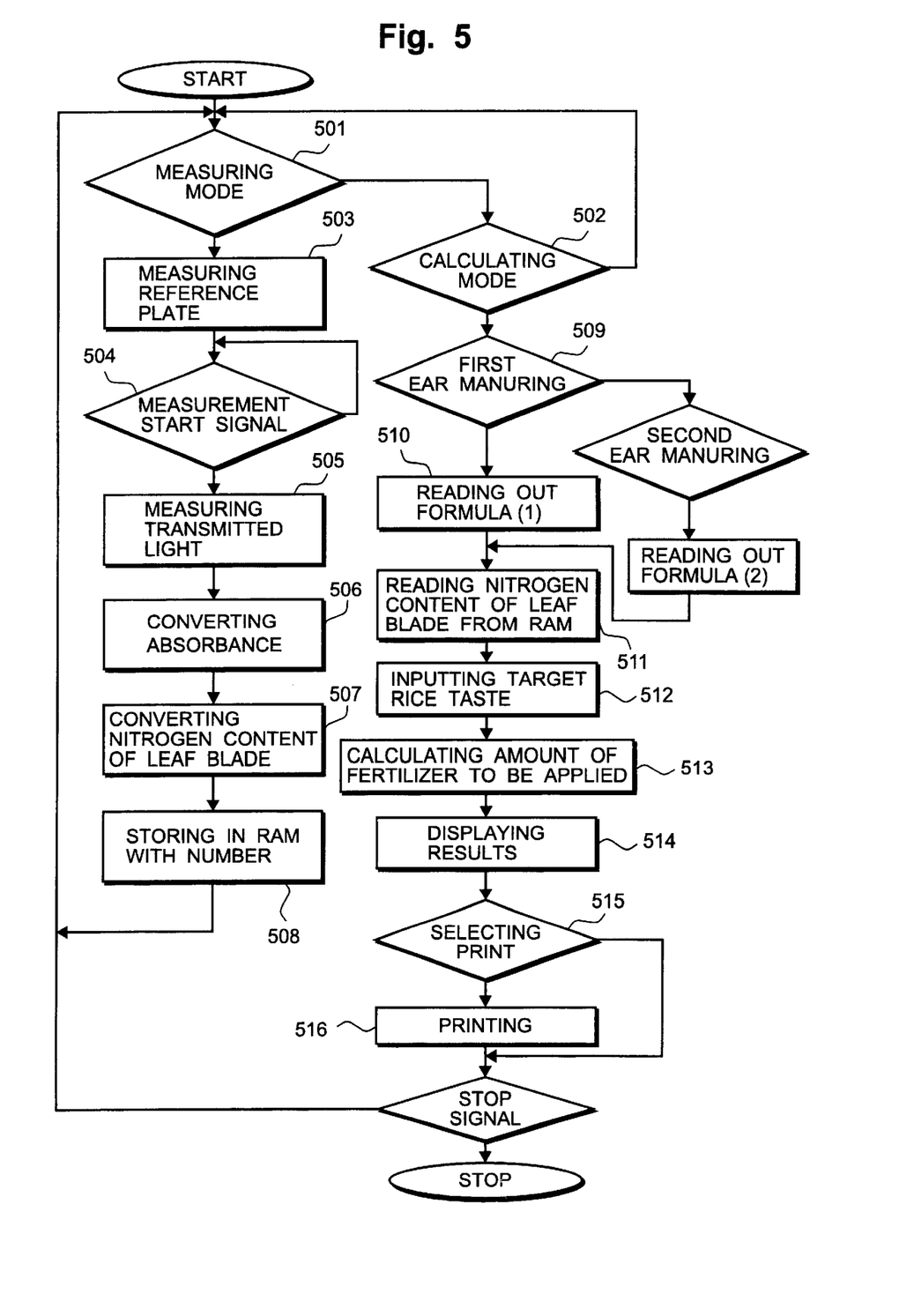
FIG. 5 is a flow chart of the block diagram for calculating the amount of fertilizer to be applied.

In the ROM 4c, the processing program as shown in FIG. 5 is stored together with the fertilizer application related formula as explained. Also, in the ROM 4c, the nitrogen amount conversion coefficient for measuring the leaf blade nitrogen content from the light transmitted through the leaf 27. The nitrogen amount conversion coefficient is obtained in advance by multiple regression analysis based on the absorbance obtained by irradiating the light having the wavelength related to the leaf blade nitrogen content in the leaf whose nitrogen content is known and the known nitrogen content with the leaf blade nitrogen content being used as the target variable. Therefore, the light source 24 is one which includes the light having the necessary wavelength for the measuring and, in between the light source 24 and the light receiving section 20, there are provided a plurality of narrow band filters 28 so that the transmitted light having the plurality of wavelengths related to the leaf blade nitrogen content can be received. The light source 24 may be more than one depending on the wavelength used. Also, if the light source is one with which the light of continuous wavelengths with intervals of several nanometers can be irradiated, no wavelength filters are necessary since the absorbance of the wavelength can be measured every several nanometers.

When the operator operates the keyboard 22 for the processing program to be started using a return key or a mouse, the operation proceeds to the measuring mode (step 501) or the calculating mode (step 502) as shown in FIG. 5. Here, the modes such as "select", "input" and "calculate" are used in the same meaning as in the operations or modes generally used in a personal computer. When the measuring mode is selected by "select", the reflected light from the reference plate (not shown) is received by the light receiving section 20 in the state where the leaf 27 is not present (step 503), and the received data is stored as a reference value of the transmitted light measurement in the RAM 4d through the A/D converter 21 and the I/O port 4a. Then, when the operator inserts the leaf 27 in between the light source 24 and the light receiving section 20 and inputs the measurement start instructions from the keyboard 22 (step 504), the light from the light source 24 transmitted through the leaf 27 is received by the light receiving section 20 (step 505). The received signal is A/D converted by the A/D converter and is stored in the RAM 4d through the I/O port. Here, the CPU 4b converts to the absorbance the signal difference between the reference value stored in the RAM 4d and the received signal (step 506). Further, by using the absorbance obtained and the nitrogen amount conversion coefficient stored in the ROM 4c, the leaf blade nitrogen content is calculated (step 507). The calculated nitrogen amount is stored in the RAM 4d together with the number entered from the keyboard 22 (step 508). In this way, the leaf blade nitrogen content of the leaf 27 of the rice crop which is growing in the field and from which the amount of fertilizer to be applied is obtained.

Next, the case wherein the calculating mode (step 502) is selected by the operator is explained. When the calculating mode has been selected, whether the fertilizer application amount is for the first ear manuring or for the second ear manuring is selected. Where the first ear manuring is selected (step 509), the above mentioned fertilizer application related formula (1) is read out from the ROM 4c (step 510), and the value to be substituted in the fertilizer application related formula (1) is read out from the RAM 4d (step 511). The reading out can be made from the keyboard 22 by entering the related number added in the step 508. Where the second ear manuring is selected, the above mentioned fertilizer application related formula (2) is read out from the ROM 4c. Here, since the rice taste is made the target value of the rice crop production, the rice taste is entered at the keyboard 22 (step 512). In the step 513, the fertilizer application amount is calculated from the fertilizer application related formula (2) read out from the ROM 4c, the leaf blade nitrogen content read out in the step 513 and the rice taste entered at the rice taste value entry step 512, and the results of the calculation are output to the display section 5 through the I/O port 4a (step 514). Thereafter, in the step 515, the print is selected and the fertilizer application amount resulted from the calculation is printed out by the printer 25 (step 516). In the printing, it is preferred to print simultaneously the related data (brands, localities, dates, leaf blade nitrogen contents, etc). Upon completion of the printing, the selections of the measuring mode and the calculating mode are repeated. When the stop instructions are entered from the keyboard 22, this processing program is stopped.

In the above, the fertilizer application related formula has been obtained, with the nitrogen content of the leaf blade, which is obtained by the absorbance and the conversion coefficient of the leaf blade nitrogen content, being the main information of the leaf blade information, but the absorbance related to the leaf blade nitrogen content can also be used as the growth information. That is, in obtaining the fertilizer application related formula, it is preferred that the absorbance be used as the explanatory variable. The absorbance in this case may be constituted by a plurality of absorbances based on a plurality of wavelengths, that is, the absorbance is not limited to one absorbance. Thus, the wavelength for obtaining the absorbance is also not limited to the wavelength related to the leaf blade nitrogen content so that, by obtaining the absorbance based on the wavelength which is considered to be related to the growth of the rice crop and the fertilizer application, this absorbance can be utilized when the fertilizer application related formula is obtained. Further, this absorbance can also be utilized, in place of the leaf blade information, in the formula explained hereinbelow.

According to the invention, by using the yield information in place of the above mentioned quality information, the fertilizer application amount for obtaining the targeted yield value in place of the targeted rice taste value mentioned above can be determined. This is explained with reference to FIGS. 1 and 2. Of a plurality of data shown in FIG. 1, when the relations among the growth information including the leaf blade information 6 related to the time for applying the first ear manuring at the specific time, for example, the leaf blade nitrogen content N1 at the panicle initiation stage just before the first ear manuring is applied; the fertilizer application information 7 of the specific stage at which first ear manuring is applied, for example, the fertilizer application amount of the first ear manuring; and the yield information 8 of the rice gains harvested after the growth of the crops, for example, the yield value of the rice, are analyzed by using the fertilizer application amount of the first ear manuring as the target variable and other information as the explanatory variable, the fertilizer application related formula for obtaining the fertilizer application amount at the specific stage can be determined in advance. In this case, when the formula is established by collecting as much information as possible on the same brand at a fixed locality, the degree of the completeness of the fertilizer application related formula is elevated. As for the analysis here, the method of analysis such as a linear analysis or a non-linear analysis is appropriate. In the fertilizer application related formula established as above, when the leaf blade nitrogen content which is the leaf blade information at the panicle initiation stage of the presently growing rice crops and the yield value of rice targeted of this growing rice crop are entered from the input section 3, the fertilizer application amount of the first ear manuring is obtained by applying the value of the input section 3 to the fertilizer application related formula in the memory section 2 and is displayed at the display section 5. Thus, based on the fertilizer amount of the first ear manuring thus derived, the producers may carry out the application of fertilizer.

In FIG. 2, the fertilizer application related formula established as above is stored at the memory section 2 of the apparatus 1 for providing production information of rice shown in block diagram. The producers enter from the input section 3 the information of the presently growing crops and, in this way, it is possible to carry out the positive fertilizer application for the production of better quality and higher yield of rice unlike the passive fertilizer application for the maintenance and control of the past yields.

An example wherein the fertilizer application amount of the second ear manuring is derived with the yield being made the target value is shown in FIGS. 1 and 2. Of the plurality of data shown in FIG. 1, when the relations among the leaf blade information 6 related to the time for applying the second ear manuring at the specific time, for example, the leaf blade nitrogen content N2 at the reduction division stage just before the second ear manuring is applied; the fertilizer application information 7 of the specific stage at which the second ear manuring is applied, for example, the fertilizer application amount of the second ear manuring; and the yield information 8 of the rice gains harvested after the growth of the crops, for example, the yield value of the rice, are analyzed by using the fertilizer application amount of the second ear manuring as the target variable and other information as the explanatory variable, the fertilizer application related formula for obtaining the fertilizer application amount at the specific stage can be established in advance. In this case, when the related formula is established by collecting as much information as possible on the same brand at a fixed locality, the degree of the completeness of the fertilizer application related formula is elevated. In the fertilizer application related formula established as above, when the leaf blade nitrogen content which is the leaf blade information at the reduction division stage of the presently growing rice crops and the yield value of rice targeted of this growing rice crop are entered from the input section 3, the fertilizer application amount of the second ear manuring is obtained by applying the value of the input section 3 to the fertilizer application related formula in the memory section 2 and by the calculation at the arithmetic and control section 4 and is displayed at the display section 5. Thus, based on the fertilizer amount of the second ear manuring thus derived, the producers may carry out the application of fertilizer. Here, in establishing the fertilizer application related formula for the second ear manuring, the leaf blade nitrogen content N1 at the panicle initiation stage as the leaf blade information and the fertilizer application amount of the first ear manuring which is already being applied as the fertilizer application information may be added.

Figure 6:
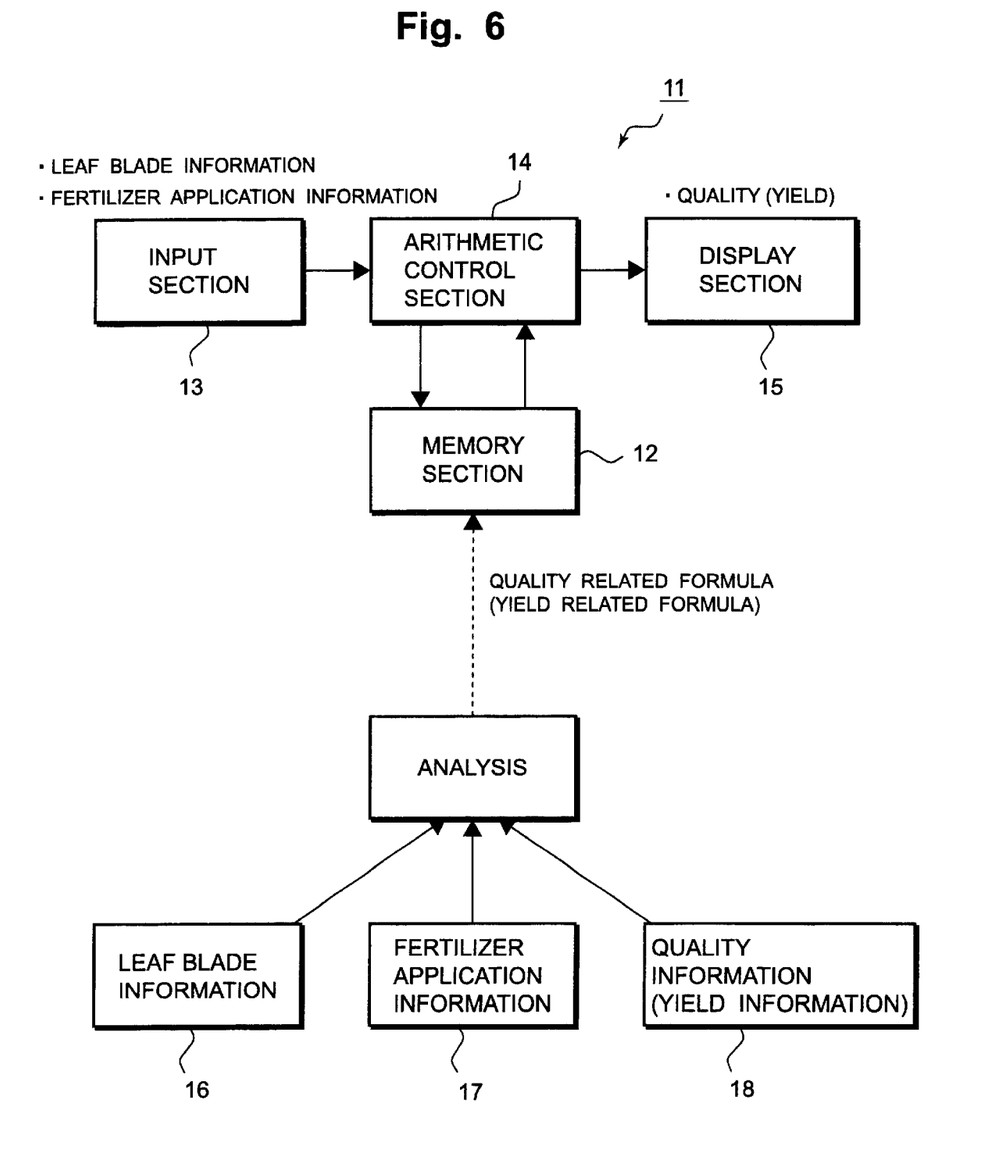
FIG. 6 is another block diagram showing an apparatus for providing information on rice production.

An example wherein the quality or yield of the rice after the growth of the rice crops is estimated is shown in FIG. 6. As shown therein, the block diagram of the apparatus 11 for providing production information of the rice includes the memory section 12 for storing the quality related formula, the input section 13 for entering the growth information including the necessary leaf blade information and the fertilizer application information, the arithmetic and control section 14 to which the memory section 12 and the input section 13 are connected and which calculates the quality of the rice after harvesting based on the related formula in the memory section 12 and the input values input at the input section 13, and the display section 15 for visually showing the quality of the rice after the harvesting which quality is the result of the calculation at the arithmetic and control section 14. The formula stored in the memory section 12 is the quality related formula for deriving the quality of rice after the harvesting, which formula is one established in advance by analyzing the relations among the leaf blade information 16, the yield information 17 and the quality information 18. In the arrangement shown in FIG. 6, based on growth information including the fertilizer application information 17 (amount, time, etc. of fertilizer application) and the leaf blade information 16 (nitrogen content, color, chlorophyll content, etc. of a leaf) at the overall growth period, or at a characteristic stage such as the panicle initiation stage or the reduction division stage and on the rice quality (rice taste and grade of rice) 18 of rice, the relations thereof are subjected to the linear analysis or the non-linear analysis with the quality being used as the targeted variable, and the quality related formula for estimating the quality of the rice to be harvested is established and stored at the memory section 12. In this way, when the producers enter the growth information of the growth period at the input section 13, by applying the growth information of the input section 13 to the quality related formula in the memory section 12, the arithmetic and control section 14 can output at the display section the quality of the rice for the case where the rice crops are to be timely reaped. The information as to good quality which heretofore was a mere wishful conjecture is now available in advance as a support for the quality.

Now an example of estimating the yield of rice after the growth of the rice crops is explained. The apparatus 11 for providing production information of the rice shown in FIG. 6 includes the memory section 12 for storing the yield related formula, the input section 13 for entering the growth information including the necessary leaf blade information and the fertilizer application information, the arithmetic and control section 14 to which the memory section 12 and the input section 13 are connected and which calculates the yield of the rice to be harvested based on the formula in the memory section 12 and the input value entered at the input section 13, and the display section 15 for visually showing the yield of the rice to be harvested which yield is the result of the calculation at the arithmetic and control section 14. The formula stored in the memory section 12 is the yield related formula for deriving the yield of rice to be harvested, which formula is one established in advance by analyzing the relations among the leaf blade information 16, the fertilizer application information 17 and the yield information 18. In the arrangement shown in FIG. 6, based on growth information including the fertilizer application information 17 (amount, time, etc. of fertilizer application) and the leaf blade information 16 (nitrogen content, color, chlorophyll content, etc. of a leaf) at the overall growth period, or at a characteristic stage such as the panicle initiation stage or the reduction division stage and on the yield information 18 of rice after the harvesting, the relations thereof are subjected to the linear analysis or the non-linear analysis with the yield being used as the targeted variable, and the yield related formula for estimating the yield of the rice to be harvested is established and stored at the memory section 12. In this way, when the producers enter the growth information of the growth period at the input section 13, by applying the growth information of the input section 13 to the yield related formula in the memory section 12, the arithmetic and control section 14 can output at the display section 15 the yield of the rice in the case where the rice crops are to be timely reaped. The information as to good yield which heretofore was a mere wishful conjecture is now available in advance as a support for the yield.

As the leaf blade information 16 in the growth information, the nitrogen content, color and chlorophyll content of a leaf may be used individually or multiply. These data can be used, similarly as the leaf blade nitrogen amount, as the explanatory variables by being taken into the above mentioned formula. The growth information may additionally include the growth days, added-up temperature, heights of plants or the number of stems, and these data may preferably be used as explanatory variables. There are also cases wherein the information as to brands of rice and soil information of localities are included. The amounts and times of fertilizer application may sometimes vary depending on brands of rice but, by establishing formulas individually for application on brand-to-brand basis, the accuracy in the determination of the amount of fertilizer application and in the estimation of the quality or yield can be enhanced. Also, since the growth of the crops is influenced by the expressiveness of the nitrogen-supplying potential of soil and the amount of fertilizer application, the establishing of formulas on soil-to-soil basis, such as gray lowland soil, gley soil or gray volcanic ash soil (kuroboku soil) will bring about the amount of fertilizer application best suited to the soil and the growth. This can be realized simply by establishing the formulas on a brand-to-band basis and a soil-to-soil basis.

The fertilizer application information 17 covers especially the fertilizer application amount but, in obtaining the fertilizer application related formula of the second ear manuring, the fertilizer application time which relates to the growth days may be considered to be added to the fertilizer application amount of the first ear manuring. This addition makes it possible to show the fertilizer application amount of the first ear manuring as a ratio with respect to the growth days and to compensate the fertilizer application amount based on the difference in the fertilizer application times by reflecting to the formula of the second ear manuring the difference in the fertilizer application amount ratio caused by the difference developed during the growth. Further, the quality information means the taste of rice, and the rice taste is sometimes replaced by the amount of, for example, protein, which is an important element value in relation to the growth of rice, and the percentages of regular grains and ripened grains and the number of ears, and these data are sometimes used as target values similarly as the rice taste value.

As already explained, the rice includes non-glutinous rice, glutinous rice and brewers' rice, and covers paddy rice in general. The specific stages such as the first ear manuring and the second ear manuring, the names of such stages, and the ways of treating the characteristic stages such as the reduction division stage and the panicle initiation stage relating to the fertilizer application as used in the explanation of the embodiments may be different and they are not limited by the embodiments.

Figure 7:
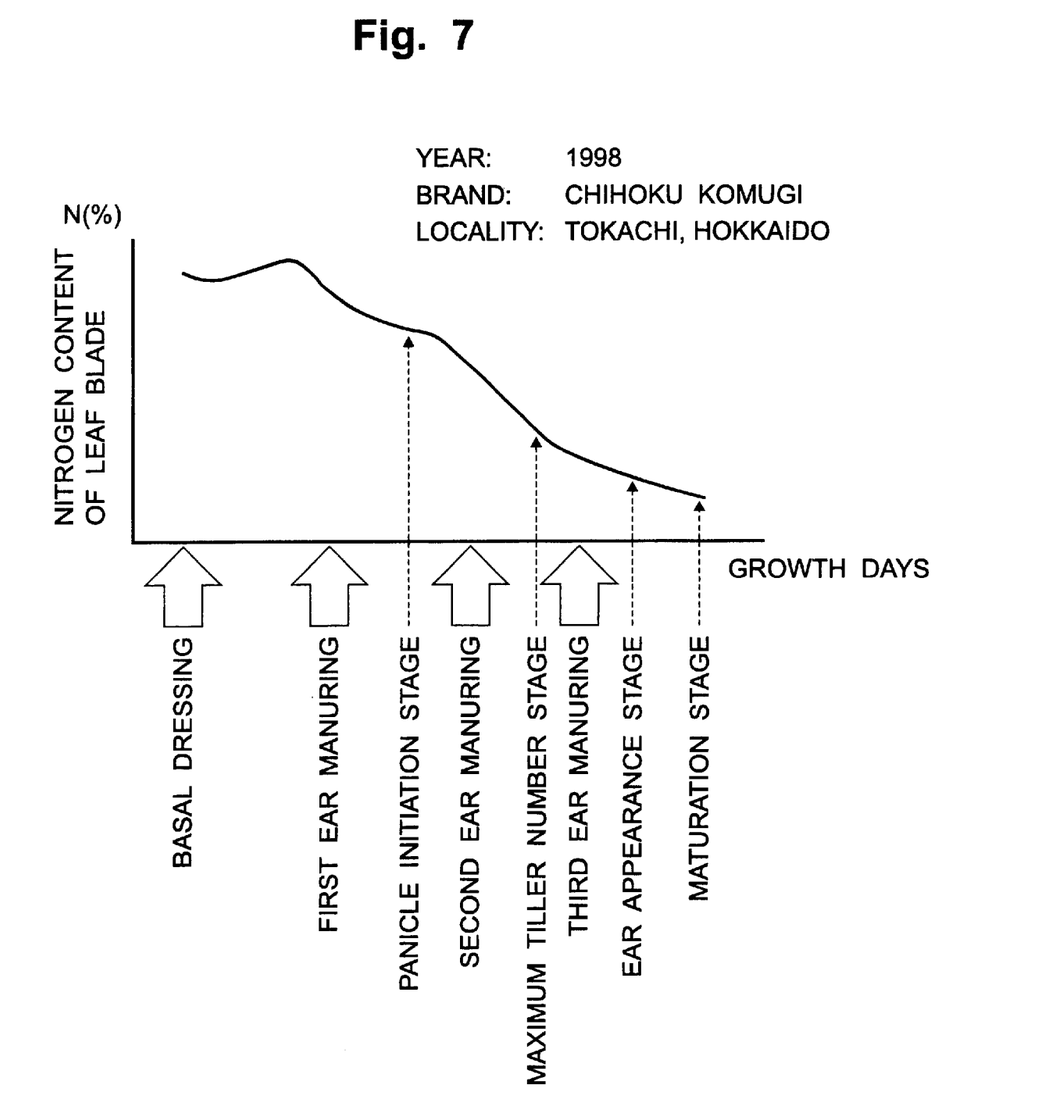
FIG. 7 is a graph showing variations in nitrogen contents in a leaf blade in growth periods of wheat.

Next, FIG. 7 shows changes in the leaf blade nitrogen content during the growth of wheat crops. In the wheat, too, it is known that the fertilizer application amounts just before and after the panicle initiation stage, and just before and after the maximum tiller number stage have great influence on the quality and/or yield of the wheat. The method and apparatus according to the invention can definitely suggest the extent of the fertilizer application amounts. Also, as in the rice, the quality or the yield of the wheat to be harvested can be estimated beforehand.

For determining the amount of fertilizer application of the first ear manuring using the targeted quality, for example, the protein content, the fertilizer application amount of, for example, the first ear manuring using the protein content as reference, the fertilizer application related formula is established by analyzing the growth information including leaf blade information before the specific stage for the application of the first ear manuring according to the past records, the fertilizer application information (first ear manuring and basal dressing added) applied then, and the quality information after the harvesting, for example, the protein content, with the fertilizer application amount at the specific time for the first ear manuring used as the target variable and other information as the explanatory variable. In this fertilizer application related formula, the growth information including the leaf blade information (or with the fertilizer amount of the basal dressing added) before the specific stage for applying the present first ear manuring and the targeted quality information value after the harvesting may be entered and, from this fertilizer application related formula, the fertilizer application amount of the first ear manuring which brings about the targeted quality value is derived. Also, when the fertilizer application amount of the first ear manuring is established with the targeted yield of the wheat being used as reference, the leaf blade related formula is established by analyzing the growth information including the leaf blade information before the specific stage for the application of the first ear manuring according to the past records, the fertilizer application information applied then, and the yield information after the harvesting, for example, the harvested wheat crops, with the fertilizer application amount at the specific time for the first ear manuring used as the target variable and other information as the explanatory variable. In this fertilizer application related formula, the growth information including the leaf blade information (or with the fertilizer amount of the basal dressing added) before the specific stage for applying the present first ear manuring and the targeted crop information value after the harvesting may be entered and, from this fertilizer application related formula, the fertilizer application amount of the first ear manuring which is to bring about the targeted crop value is derived.

For determining the fertilizer application amount of the second ear manuring, the fertilizer application related formula is established by analyzing the growth information including leaf blade information before the specific stage for the application of the second ear manuring according to the past records, the fertilizer application information (second ear manuring or the first ear manuring and basal dressing added) applied then, and the quality information (or yield information after the harvesting) after the harvesting, with the fertilizer application amount at the specific time for the second ear manuring used as the target variable and other information as the explanatory variable. In this fertilizer application related formula, the growth information including the leaf blade information (or with the fertilizer amount of the first ear manuring and the basal dressing added) before the specific stage for applying the present second ear manuring and the targeted quality information value (or harvested crops) after the harvesting may be entered and, from this fertilizer application related formula, the fertilizer application amount of the second ear manuring which brings about the targeted quality value (or harvested crops) is derived. In the case of the fertilizer application amount of third ear manuring, the amount of fertilizer to be applied can also be determined as above. The producers may apply the fertilizer in the amount thus established, and the production follows the track towards the targeted quality or yield.

Also, in the case where the quality or the yield after the harvesting is estimated, too, the present invention can effectively be utilized by establishing the quality related formula or the yield related formula as in the embodiments related to rice. The fertilizer application for the crops, for example, wheat, barley, rye and brewers' wheat in which the main elements of fertilizer to be applied vary in nitrogen, phosphate and potassium respectively, it may be effective if the fertilizer application amount is decided based on individual brands of wheat and individual elements of fertilizer application.

As explained above, by entering the growth information and the quality value targeted by the producers in the fertilizer application related formula, the fertilizer amount to be applied at the specific stage can be derived, and the producers may effect the fertilizer application simply following the derived results. Since such fertilizer application amount is directed towards the definite target, the producers do not need to rely on their experience or intuition, and the production follows the track towards the targeted quality.

Also, as explained above, by entering the growth information and the yield value targeted by the producers in the fertilizer application related formula, the fertilizer amount to be applied at the specific stage can be derived, and the producers may effect the fertilizer application simply following the derived results. Since such fertilizer application amount is directed towards the definite target, the producers do not need to rely on their experience or intuition, and the production follows the track towards the targeted yield.

Further, by entering the leaf blade information and the fertilizer application information in the quality related formula according to the invention, the quality of the grains after the harvesting can be estimated in advance of the harvesting. For example, when the taste of the rice is ensured in advance before the harvesting, this information can serve as an advantageous condition in the sales of rice.

Also, by entering the leaf blade information and the fertilizer application information in the yield related formula according to the invention, the yield of the grains after the harvesting can be estimated in advance of the harvesting. This information provides an advantageous assurance for the yield in advance.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for determining an amount of fertilizer to be applied to grain crops in their growth stages, said method comprising the steps of:

establishing a fertilizer application related formula for obtaining an amount of fertilizer to be applied to grain crops for each specific period, by analyzing growth information including leaf blade information in relation to specific periods of the grain crops, fertilizer application information for the specific periods, and quality information of the grains produced, said growth information, said fertilizer application information and said quality information all having been obtained in advance from a number of grains; and calculating the amount of fertilizer application necessary for each specific period for the grain crops which are presently under growth by applying to said fertilizer application related formula, growth information of the grain crops presently under growth including leaf blade information in relation to a specific period, and target quality information.

2. A method for determining an amount of fertilizer to be applied to grain crops according to claim 1, in which said growth information includes quality/soil information.

3. A method for determining an amount of fertilizer to be applied to grain crops according to claim 1 or 2, in which said leaf blade information is a value related to at least one of nitrogen content, color and chlorophyll content of a leaf blade obtained by spectral analysis of the leaf blade presently under growth.

4. A method for determining an amount of fertilizer to be applied to grain crops, said method comprising:

establishing a fertilizer application related formula for obtaining an amount of fertilizer to be applied to grain crops for each specific period, by analyzing growth information including leaf blade information in relation to specific periods of the grain crops, fertilizer application information for the specific periods, and yield information of the grains produced, said growth information, said fertilizer application information and said yield information all having been obtained in advance from a number of grains; and calculating the amount of fertilizer application necessary for each specific period for the grain crops which are presently under growth by applying to said fertilizer application related formula, growth information including leaf blade information of the grain crops presently under growth in relation to a specific period, and target yield information.

5. A method for determining an amount of fertilizer to be applied to grain crops according to claim 4, in which said growth information includes quality/soil information.

6. A method for determining an amount of fertilizer to be applied to grain crops according to claim 4 or 5, in which said leaf blade information is a value related to at least one of nitrogen content, color, and chlorophyll content of a leaf blade obtained by spectral analysis of the leaf blade presently under growth.

* * * * *